United States Patent
Nozaki et al.

(10) Patent No.: US 11,389,847 B2
(45) Date of Patent: Jul. 19, 2022

(54) CENTRIFUGALLY CAST COMPOSITE ROLL FOR ROLLING AND ITS PRODUCTION METHOD

(71) Applicant: HITACHI METALS, LTD., Tokyo (JP)

(72) Inventors: Yasunori Nozaki, Kitakyusyu (JP); Nozomu Oda, Kitakyusyu (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 17/258,492

(22) PCT Filed: Aug. 7, 2019

(86) PCT No.: PCT/JP2019/031259
§ 371 (c)(1),
(2) Date: Jan. 7, 2021

(87) PCT Pub. No.: WO2020/032144
PCT Pub. Date: Feb. 13, 2020

(65) Prior Publication Data
US 2021/0154712 A1    May 27, 2021

(30) Foreign Application Priority Data
Aug. 8, 2018  (JP) ............................... JP2018-149758

(51) Int. Cl.
*B21B 27/02*    (2006.01)
*B21B 27/03*    (2006.01)
(Continued)

(52) U.S. Cl.
CPC ............ *B21B 27/02* (2013.01); *B21B 27/021* (2013.01); *B21B 27/032* (2013.01); *B22D 13/026* (2013.01); *B22D 19/16* (2013.01)

(58) Field of Classification Search
CPC ....... B21B 27/02; B21B 27/021; B21B 27/03; B21B 27/032; B22D 13/026; B22D 19/16
See application file for complete search history.

(56) References Cited

U.S. PATENT DOCUMENTS 9,358,758 B2 * 6/2016 Oda ...................... C22C 37/10
9,573,176 B2 * 2/2017 Ichino .................. C22C 38/02
(Continued)

FOREIGN PATENT DOCUMENTS

| EP | 3050636 A1 | 8/2016 |
| EP | 3050637 A1 | 8/2016 |

(Continued)

OTHER PUBLICATIONS

International Search Report for PCT/JP2019/031259 dated Oct. 21, 2019.
(Continued)

*Primary Examiner* — Jason L Vaughan
(74) *Attorney, Agent, or Firm* — Sughrue Mion, PLLC (57) ABSTRACT

A centrifugally cast composite roll for rolling comprising an outer layer and an inner layer, which are integrally fused to each other, the outer layer being made of an Fe-based alloy comprising by mass 1.70-2.70% of C, 0.3-3% of Si, 0.1-3% of Mn, 1.1-3.0% of Ni, 4.0-10% of Cr, 2.0-7.5% of Mo, 3-6.0% of V, 0.1-2% of W, 0.2-2% of Nb, 0.01-0.2% of B, and 0.01-0.1% of N, the balance being Fe and inevitable impurities, and the inner layer being made of ductile cast iron.

4 Claims, 2 Drawing Sheets

(51) Int. Cl.
    *B22D 19/16*     (2006.01)
    *B22D 13/02*     (2006.01)

(56) References Cited

U.S. PATENT DOCUMENTS

| | | |
|---|---|---|
| 9,708,695 B2 * | 7/2017 | Ichino .................... C22C 37/06 |
| 9,757,779 B2 * | 9/2017 | Oda ........................ C22C 38/02 |
| 9,975,158 B2 * | 5/2018 | Ichino ...................... C21D 9/38 |
| 2016/0193637 A1 | 7/2016 | Oda et al. |
| 2016/0193638 A1 | 7/2016 | Hattori et al. |
| 2016/0207084 A1 | 7/2016 | Hattori et al. |
| 2017/0209906 A1 * | 7/2017 | Itoh ......................... C21D 5/00 |
| 2020/0298294 A1 | 9/2020 | Nozaki et al. |

FOREIGN PATENT DOCUMENTS

| | | |
|---|---|---|
| JP | 06-179947 A | 6/1994 |
| JP | H0820837 A | 1/1996 |
| JP | 8-060289 A | 3/1996 |
| JP | 11-043736 A | 2/1999 |
| JP | 2000-160277 A | 6/2000 |
| JP | 2015-205342 A | 11/2015 |
| JP | 2016-180168 A | 10/2016 |
| WO | 2015/045720 A1 | 4/2015 |
| WO | 2015/045984 A1 | 4/2015 |
| WO | 2015/045985 A1 | 4/2015 |
| WO | 2017170570 A1 | 10/2017 |

OTHER PUBLICATIONS

Communication dated Mar. 11, 2021, from the European Patent Office in European Application No. 19846099.0.

* cited by examiner

CENTRIFUGALLY CAST COMPOSITE ROLL FOR ROLLING AND ITS PRODUCTION METHOD

CROSS-REFERENCE TO RELATED APPLICATIONS

This application is a National Stage of International Application No. PCT/JP2019/031259 filed Aug. 7, 2019, which claims priority under 35 U.S.C. § 119(a) to Japanese Patent Application No. 2018-149758 filed on Aug. 8, 2018.

FIELD OF THE INVENTION

The present invention relates to a centrifugally cast composite roll for rolling comprising an outer layer having excellent wear resistance and an inner layer having excellent toughness, which are integrally fused to each other, and its production method, particularly to a centrifugally cast composite roll suitable as a work roll for finish rolling in a hot strip mill for steel strips, and its production method.

BACKGROUND OF THE INVENTION

A heated slab as thick as several hundreds of millimeters, which is produced by continuous casting, etc., is rolled to thickness of several to several tens of millimeters by a hot strip mill comprising a roughing mill and a finishing mill. The finishing mill usually comprises 5 to 7 four-roll stands arranged in tandem. In the case of a seven-stand finishing mill, first to third stands are called "front stands," and fourth to seventh stands are called "rear stands."

Because a work roll used in such a hot strip mill comes into contact with a hot strip, damages such as wearing, surface roughening, heat cracking, etc. occur on the outer surface of the work roll by a thermal and mechanical rolling load. After removing damaged portions by grinding, the work roll is used again for rolling. The removal of damaged portions from a surface portion of the roll by grinding is called "damage-removing grinding." After the work roll is ground from its initial diameter to the minimum diameter usable for rolling (discard diameter) to remove damages, it is discarded. This minimum usable diameter is called "discard diameter." The discard diameter is usually determined by the specification of a mill. Also, a range from the initial diameter to the discard diameter is called "usable roll diameter." In the usable roll diameter, an outer layer of a hot-rolling roll is required to have excellent wear resistance for less wearing.

As a roll satisfying such high-quality requirements, solid composite rolls comprising outer layers made of indefinite chilled iron, high-chromium cast iron, etc. and inner layers made of cast iron or cast steel, which are integrally fused to each other, have conventionally been used, and recently a composite roll comprising an outer layer made of high-speed steel having improved wear resistance as described in JP 8-60289 A has been getting used. This high-speed steel contains large amounts of alloying elements such as Cr, Mo, V, W, etc., and has extremely hard carbides crystallized, exhibiting excellent wear resistance.

However, because the high-speed steel roll is likely to stick to a steel strip, and has as large residual compressive stress as more than 300 MPa on the outer layer surface, it is likely to suffer problems described below when used for finishing hot-strip mills of steel strips or sheets. Namely, when an end portion of a steel strip is folded by various causes in an actual rolling operation, resulting in the rolling of pluralities of overlapped sheets, which is called "cobble" hereinafter, the steel strip is likely to stick to the roll surface, resulting in deep cracks on the roll surface. Such cracks tend to propagate inside the roll surface with large angles. Residual compressive stress acts as shearing stress to accelerate the propagation of cracking. Namely, the higher the residual compressive stress, the more cracks propagate. Further, because the residual compressive stress acts as tensile stress to peel the outer layer in a radial direction of the roll, it increases the likelihood of inducing delayed failure, such as the peeling of the outer layer, etc. Once cracking occurs, the exchange of a rolling roll is needed, resulting in lower efficiency and higher cost of rolling operation. Accordingly, the high-speed steel roll does not necessarily have sufficient performance as a rolling roll as a whole, despite excellent wear resistance and toughness.

As a rolling roll solving such problem, JP 2015-205342 A discloses a centrifugally cast composite roll for hot rolling comprising an outer layer comprising by mass 1.0-3.0% of C, 0.3-2.0% of Si, 0.1-1.6% of Mn, 0.1-3.0% of Ni, 3.0-10.0% of Cr, 2.0-10.0% of Mo, 0.01-8.0% of W, 4.0-10.0% of V, and 0.1-6.0% of Nb, the balance being Fe and inevitable impurities; an inner layer made of ductile cast iron; and an intermediate layer made of cast iron; the V content in the intermediate layer near a boundary with the inner layer being 55% or less of the V content in the outer layer at the discard diameter; and the Cr content in the intermediate layer near a boundary with the inner layer being 50% or higher of the Cr content of the outer layer at the discard diameter. This roll has excellent wear resistance with good fusion of the outer layer, the intermediate layer and the inner layer, and the outer layer has residual compressive stress of 150-500 MPa so as not to accelerate the propagation of cracking. However, composite rolls having outer layers of high-speed steel as described above do not have improved sticking resistance, insufficient in suppressing cobble. Accordingly, a high-speed steel roll having excellent wear resistance and sticking resistance together with high cobble resistance is demanded.

WO 2015/045984 A1 discloses a centrifugally cast composite roll for hot rolling comprising a centrifugally cast outer layer and an inner layer made of ductile cast iron, which are integrally fused to each other; the outer layer having a chemical composition comprising by mass 1-3% of C, 0.4-3% of Si, 0.3-3% of Mn, 1-5% of Ni, 2-7% of Cr, 3-8% of Mo, 3-7% of V, and 0.01-0.12% of B, the balance being Fe and inevitable impurities, meeting the relation expressed by the formula (1): $Cr/(Mo+0.5W) \leq -\frac{2}{3}[C-0.2(V+1.19Nb)]+11/6$, wherein when W and Nb, optional components, are not contained, W=0, and Nb=0; and containing by area 1-15% of MC carbide, 0.5-20% of carboboride, and 0.5-20% of Mo carbide. Also, WO 2015/045985 A1 discloses a centrifugally cast composite roll for hot rolling comprising a centrifugally cast outer layer and an inner layer made of ductile cast iron, which are integrally fused to each other; the outer layer having a chemical composition comprising by mass 1.6-3% of C, 0.3-2.5% of Si, 0.3-2.5% of Mn, 0.1-5% of Ni, 2.8-7% of Cr, 1.8-6% of Mo, 3.3-6.5% of V, and 0.02-0.12% of B, the balance being Fe and inevitable impurities, meeting the relation expressed by the formula (1): $Cr/(Mo+0.5W) \geq -\frac{2}{3}[C-0.2(V+1.19Nb)]+11/6$, wherein when W and Nb, optional components, are not contained, W=0, and Nb=0, and containing by area 1-15% of MC carbide, 0.5-20% of carboboride, and 1-25% of Cr carbide. However, the outer layers of these centrifugally cast composite rolls for hot rolling may not have low residual compressive stress despite excellent wear resistance, sticking resistance (incident resistance) and surface roughening resistance, so that they are not necessarily sufficient in suppressing the propagation of cracking and preventing delayed failure.

WO 2015/045720 A1 discloses a centrifugally cast composite roll comprising a centrifugally cast outer layer and an inner layer made of ductile cast iron, which are integrally fused to each other; the outer layer being made of an Fe-based alloy comprising at least one element selected from the group consisting by mass of 1.3-3.7% of C, 0.3-3% of Si, 0.1-3% of Mn, 1-7% of Cr, 1-8% of Mo, 2.5-7% of V, 0.1-3% of Nb, and 0.1-5% of W, V being indispensable, and further containing 0.01-0.2% of B and/or 0.05-0.3% of S, the balance being substantially Fe and inevitable impurities; the structure of the outer layer containing no graphite; the inner layer comprising a core portion fused to the outer layer, and a drive-side shaft portion and a free-side shaft portion integrally extending from both ends of the core portion, the total amount of Cr, Mo, V, Nb and W in an end portion of the drive-side shaft portion being 0.35-2% by mass, and the total amount of Cr, Mo, V, Nb and W in an end portion of the free-side shaft portion being 0.15-1.8% by mass, the former being more than the latter by 0.2% or more by mass. However, the outer layer of this centrifugally cast composite roll may not have low residual compressive stress despite excellent wear resistance and incident resistance, so that it is not necessarily sufficient in suppressing the propagation of cracking and preventing delayed failure.

JP 6-179947 A discloses a centrifugally cast composite roll comprising an outer layer, and a shaft of usual cast iron or ductile cast iron integrally fused to the outer layer, the outer layer comprising 1.5-3.5% of C, 1.5% or less of Si, 1.2% or less of Mn, 5.5-12.0% of Cr, 1.0-8.0% of Mo, more than 1.0 to 4.0% of W, 3.0-10.0% of V, and 0.6-7.0% of Nb, and the balance being Fe and inevitable impurities, and meeting the formulae of $V+1.8Nb \leq 7.5C-6.0(\%)$, $Mo+3.0W \leq 14.0$, and $0.2 \leq Nb/V \leq 0.8$. However, the outer layer of this centrifugally cast composite roll may not have low residual compressive stress despite excellent wear resistance and incident resistance, so that it is not necessarily sufficient in suppressing the propagation of cracking and preventing delayed failure.

OBJECTS OF THE INVENTION

Accordingly, an object of the present invention is to provide a centrifugally cast composite roll for rolling comprising an outer layer having low residual compressive stress in an entire region for rolling, as well as excellent wear resistance and sticking resistance, and its production method.

SUMMARY OF THE INVENTION

The centrifugally cast composite roll of the present invention for rolling comprises an outer layer and an inner layer, which are integrally fused to each other;
the outer layer being made of an Fe-based alloy comprising by mass 1.70-2.70% of C, 0.3-3% of Si, 0.1-3% of Mn, 1.1-3.0% of Ni, 4.0-10% of Cr, 2.0-7.5% of Mo, 3-6.0% of V, 0.1-2% of W, 0.2-2% of Nb, 0.01-0.2% of B, and 0.01-0.1% of N, the balance being Fe and inevitable impurities; and
the inner layer being made of ductile cast iron.

In the centrifugally cast composite roll of the present invention for rolling, the outer layer preferably has circumferential residual compressive stress of 150-350 MPa at the discard diameter. Also, the outer layer preferably has Shore hardness of 70-90 at the initial diameter.

The method of the present invention for producing a centrifugally cast composite roll for rolling comprising an outer layer and an inner layer integrally fused to each other; the outer layer being made of an Fe-based alloy comprising by mass 1.70-2.70% of C, 0.3-3% of Si, 0.1-3% of Mn, 1.1-3.0% of Ni, 4.0-10% of Cr, 2.0-7.5% of Mo, 3-6.0% of V, 0.1-2% of W, 0.2-2% of Nb, 0.01-0.2% of B, and 0.01-0.1% of N, the balance being Fe and inevitable impurities; and the inner layer being made of ductile cast iron, comprises the steps of centrifugally casting the outer layer in a rotating centrifugally casting cylindrical mold;
casting a melt for the inner layer into a cavity of the outer layer;
reheating the outer layer to an austenization temperature or higher after or during casting the inner layer; and
cooling the resultant composite roll at a cooling rate of 10-60° C./hr between the reheating temperature and 600° C.

The centrifugally cast composite roll is preferably tempered at a temperature of 500-550° C., after cooled from 600° C. to a range of room temperature to 450° C.

Effects of the Invention

Because the centrifugally cast composite roll for rolling according to the present invention has a structure comprising an outer layer and an inner layer directly and integrally fused to each other, and excellent wear resistance and sticking resistance, with the outer layer having as low circumferential residual compressive stress as 150-350 MPa at the discard diameter, cracks generated on the roll surface are unlikely to induce delayed failure even after cobble occurs. The circumferential residual compressive stress on the outer layer surface is lower in a range from the initial diameter to an intermediate diameter in which the roll is used for rolling, than at the discard diameter, which is the minimum usable diameter. Thus, the control of circumferential residual compressive stress at the discard diameter makes it possible to have low circumferential residual compressive stress in an entire range usable for rolling from the initial diameter to the discard diameter. Accordingly, even after cracking occurs in the outer layer, the propagation of inward cracking can be effectively prevented, making it easy to handle the centrifugally cast composite roll.

DESCRIPTION OF THE PREFERRED EMBODIMENTS

The embodiments of the present invention will be explained in detail below without intention of restricting the present invention thereto. Various modifications may be made within the scope of the technical idea of the present invention. The simple description of "%" means "% by mass" unless otherwise mentioned.

Figure 1:
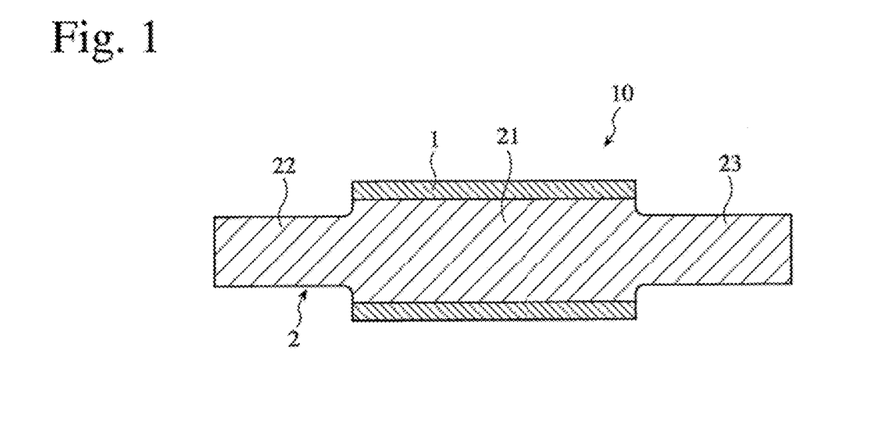
FIG. 1 is a schematic cross-sectional view showing an example of centrifugally cast composite rolls for rolling.

FIG. 1 shows a centrifugally cast composite roll 10 for rolling comprising a centrifugally cast outer layer 1, and an inner layer 2 integrally fused to the outer layer 1. The inner layer 2 made of ductile cast iron comprises a core portion 21 fused to the outer layer 1, and shaft portions 22, 23 integrally extending from both ends of the core portion 21.

[1] Centrifugally Cast Composite Roll for Rolling (A) Outer Layer

An Fe-based alloy for the centrifugally cast outer layer has a chemical composition comprising by mass 1.70-2.70% of C, 0.3-3% of Si, 0.1-3% of Mn, 1.1-3.0% of Ni, 4.0-10% of Cr, 2.0-7.5% of Mo, 3-6.0% of V, 0.1-2% of W, 0.2-2% of Nb, 0.01-0.2% of B, and 0.01-0.1% of N, the balance being Fe and inevitable impurities. With the outer layer having such composition, the centrifugally cast composite roll can have excellent wear resistance and sticking resistance, with the outer layer having low circumferential residual compressive stress at the discard diameter. The Fe-based alloy of the outer layer may further contain at least one selected from the group consisting by mass of 0.1-10% of Co, 0.01-0.5% of Zr, 0.005-0.5% of Ti, and 0.001-0.5% of Al.

(1) Indispensable Elements (a) C: 1.70-2.70% by Mass

C is combined with V, Cr, Mo, Nb and W to form hard carbides, contributing to improvement in the wear resistance of the outer layer. When C is less than 1.70% by mass, too small amounts of hard carbides are crystallized, failing to provide the outer layer with sufficient wear resistance. On the other hand, when C exceeds 2.70% by mass, excessive carbides are crystallized, providing the outer layer with lower toughness and lower cracking resistance, so that deep cracks are formed by rolling, resulting in increased roll loss in damage-removing grinding. The lower limit of the C content is preferably 1.75% by mass, and more preferably 1.80% by mass. The upper limit of the C content is preferably 2.65% by mass, and more preferably 2.60% by mass. As an example, the C content range is preferably 1.75-2.65% by mass, and more preferably 1.80-2.60% by mass.

(b) Si: 0.3-3% by Mass

Si deoxidizes the melt to reduce oxide defects, is dissolved in the matrix to improve sticking resistance, and improves the fluidity of the melt to prevent casting defects. Less than 0.3% by mass of Si has an insufficient effect of deoxidizing the melt, and provides the melt with insufficient fluidity, resulting in a higher percentage of defects. On the other hand, when Si exceeds 3% by mass, the alloy matrix becomes brittle, providing the outer layer with low toughness. The lower limit of the Si content is preferably 0.4% by mass, more preferably 0.5% by mass, and most preferably 0.6% by mass. Also, the upper limit of the Si content is preferably 2.7% by mass, more preferably 2.5% by mass, and most preferably 2% by mass. As an example, the Si content range is preferably 0.4-2.7% by mass, more preferably 0.5-2.5% by mass, and most preferably 0.6-2% by mass.

(c) Mn: 0.1-3% by Mass

Mn has a function to deoxidize the melt, and fix S as MnS. Because MnS having a lubricating function is effective to prevent the sticking of a strip being rolled, it is preferable to contain a desired amount of MnS. Less than 0.1% by mass of Mn does not have sufficient effects. On the other hand, even though Mn exceeds 3% by mass, further effects cannot be obtained. The lower limit of the Mn content is preferably 0.2% by mass, and more preferably 0.3% by mass. Also, the upper limit of the Mn content is preferably 2.4% by mass, more preferably 1.8% by mass, and most preferably 1% by mass. As an example, the Mn content range is preferably 0.2-2.4% by mass, more preferably 0.3-1.8% by mass, and most preferably 0.3-1% by mass.

(d) Ni: 1.1-3.0% by Mass

Because Ni has a function of improving the hardenability of the matrix, Ni added to a large composite roll can prevent the formation of pearlite during cooling, increasing the hardness of the outer layer. With the improved hardenability, a cooling rate for obtaining the hardness of the outer layer can be made lower, thereby reducing the residual compressive stress. Less than 1.1% by mass of Ni fails to provide sufficient effects, while more than 3.0% by mass of Ni excessively stabilizes austenite, making it difficult to increase hardness. The lower limit of the Ni content is preferably 1.2% by mass, more preferably 1.3% by mass, and most preferably 1.4% by mass. Also, the upper limit of the Ni content is preferably 2.9% by mass, more preferably 2.8% by mass, and most preferably 2.7% by mass. As an example, the Ni content range is preferably 1.2-2.9% by mass, more preferably 1.3-2.8% by mass, and most preferably 1.4-2.7% by mass.

(e) Cr: 4.0-10% by Mass

Cr is an effective element for providing a bainite or martensite matrix to have high hardness, thereby securing wear resistance. When Cr is less than 4.0% by mass, its effects are insufficient. On the other hand, more than 10% by mass of Cr decreases the toughness of the matrix. The lower limit of the Cr content is preferably 4.1% by mass, and more preferably 4.2% by mass. Also, the upper limit of the Cr content is preferably 7.5% by mass, and more preferably 7.3% by mass. As an example, the Cr content range is preferably 4.1-7.5% by mass, and more preferably 4.2-7.3% by mass.

(f) Mo: 2.0-7.5% by Mass

Mo is combined with C to form hard carbides ($M_6C$, $M_2C$), increasing the hardness of the outer layer, and improving the hardenability of the matrix. When Mo is less than 2.0% by mass, the formation of hard carbides is particularly insufficient. On the other hand, when Mo is more than 7.5% by mass, the outer layer has low toughness. The lower limit of the Mo content is preferably 3.0% by mass, and more preferably 3.2% by mass. Also, the upper limit of the Mo content is preferably 7.0% by mass, more preferably 6.5% by mass, and most preferably 6.0% by mass. As an example, the Mo content range is preferably 3.0-7.0% by mass, more preferably 3.2-6.5% by mass, and most preferably 3.2-6.0% by mass.

(g) V: 3-6.0% by Mass

V is an element combined with C to form hard MC carbide. MC carbide having Vickers hardness Hv of 2500-3000 is the hardest carbide. When V is less than 3% by mass, its effects are insufficient. On the other hand, when V is more than 6.0% by mass, MC carbide having a low specific gravity is concentrated in an inner portion of the outer layer by a centrifugal force during centrifugal casting, likely providing a large radial segregation of MC carbide, and generating larger MC carbide, which provides a coarser alloy structure and causes surface roughening during rolling. The lower limit of the V content is preferably 3.2% by mass, and more preferably 3.5% by mass. Also, the upper limit of the V content is preferably 5.8% by mass, more preferably 5.6% by mass, and most preferably 5.5% by mass. As an example, the V content range is preferably 3.2-5.8% by mass, more preferably 3.5-5.6% by mass, and most preferably 3.5-5.5% by mass.

(h) W: 0.1-2% by Mass

W is combined with C to form hard carbides such as $M_6C$, etc., contributing to improvement in the wear resistance of the outer layer. It is also dissolved in MC carbide to increase its specific gravity, reducing the segregation of the MC carbide. Less than 0.1% by mass of W added fails to provide sufficient effects. On the other hand, when W exceeds 2% by mass, $M_6C$ carbide increases, making the structure inhomogeneous, and thus causing surface roughening. The lower limit of the W content is preferably 0.2% by mass. Also, the upper limit of the W content is preferably 1.9% by mass, and more preferably 1.8% by mass. As an example, the W content range is preferably 0.2-1.9% by mass, and more preferably 0.2-1.8% by mass.

(i) Nb: 0.2-2% by Mass

Like V, Nb is combined with C to form hard MC carbide. Nb is dissolved in MC carbide when added together with V and Mo, to strengthen the MC carbide, thereby improving the wear resistance of the outer layer. Because the density difference is smaller between NbC (MC carbide) and the melt than between VC (MC carbide) and the melt, the segregation of MC carbide is reduced. Less than 0.2% by mass of Nb added provides insufficient effects. On the other hand, when Nb exceeds 2% by mass, MC carbide is aggregated, unlikely obtaining a good outer layer. The lower limit of the Nb content is preferably 0.4% by mass, and more preferably 0.5% by mass. Also, the upper limit of the Nb content is preferably 1.9% by mass, more preferably 1.8% by mass, and most preferably 1.7% by mass. As an example, the Nb content range is preferably 0.4-1.9% by mass, more preferably 0.5-1.8% by mass, and most preferably 0.5-1.7% by mass.

(j) B: 0.01-0.2% by Mass

B is dissolved in carbide, and forms carboboride having a lubricating function, improving sticking resistance. Because carboboride remarkably exhibits the lubricating function particularly at high temperatures, it is effective to prevent sticking when the biting of a hot-rolled strip occurs. B is also effective to increase the hardness, contributing to securing the hardness of the outer layer to reduce residual compressive stress. Less than 0.01% by mass of B fails to provide a sufficient lubricating function. On the other hand, more than 0.2% by mass of B makes the outer layer brittle. The lower limit of the B content is preferably 0.02% by mass, and more preferably 0.03% by mass. Also, the upper limit of the B content is preferably 0.18% by mass, and more preferably 0.15% by mass. As an example, the B content range is preferably 0.02-0.18% by mass, and more preferably 0.03-0.15% by mass.

(k) N: 0.01-0.1% by Mass

N has an effect of making carbides finer. Less than 0.01% by mass of N provides an insufficient effect of making carbides finer, while more than 0.1% by mass of N makes the outer layer brittle. To obtain a sufficient effect of making carbides finer, the lower limit of the N content is preferably 0.015% by mass, and more preferably 0.02% by mass. Also, the upper limit of the N content is preferably 0.09% by mass, and more preferably 0.08% by mass. As an example, the N content range is preferably 0.015-0.09% by mass, and more preferably 0.02-0.08% by mass.

(2) Optional Elements

The outer layer may further contain at least one element selected from the group consisting by mass of 0.1-10% of Co, 0.01-0.5% of Zr, 0.005-0.5% of Ti, and 0.001-0.5% of Al. The outer layer may further contain 0.3% or less by mass of S.

(a) Co: 0.1-10% by Mass

Co is dissolved in the matrix, increasing the hot hardness of the matrix and improving the wear resistance and surface roughening resistance. Less than 0.1% by mass of Co provides substantially no effects, while more than 10% by mass of Co fails to prove further improvement. The lower limit of the Co content is more preferably 1% by mass. Also, the upper limit of the Co content is more preferably 7% by mass, and most preferably 6% by mass. As an example, the Co content range is more preferably 1-7% by mass, and most preferably 1-6% by mass.

(b) Zr: 0.01-0.5% by Mass

Like V and Nb, Zr is combined with C to form MC carbide, improving wear resistance. Zr also forms an oxide in the melt, and this oxide functions as crystal nuclei for making the solidified structure finer. Further, Zr increases the specific gravity of MC carbide, effectively preventing segregation. To obtain this effect, the amount of Zr added is preferably 0.01% or more by mass. However, more than 0.5% by mass of Zr undesirably forms inclusions. The upper limit of the Zr content is more preferably 0.3% by mass. To obtain sufficient effects, the lower limit of the Zr content is more preferably 0.02% by mass. As an example, the Zr content range is more preferably 0.02-0.3% by mass.

(c) Ti: 0.005-0.5% by Mass

Ti is combined with C and N to form hard granular compounds such as TiC, TiN and TiCN. They act as nuclei for the MC carbide, making the MC carbide homogeneously dispersed, thereby contributing to improvement in wear resistance and surface roughening resistance. To obtain this effect, the amount of Ti added is preferably 0.005% or more by mass. However, more than 0.5% by mass of Ti increases the viscosity of the melt, likely causing casting defects. The upper limit of the Ti content is more preferably 0.3% by mass, and most preferably 0.2% by mass. To obtain sufficient effects, the lower limit of the Ti content is more preferably 0.01% by mass. As an example, the Ti content range is more preferably 0.01-0.3% by mass, and most preferably 0.01-0.2% by mass.

(d) Al: 0.001-0.5% by Mass

Al acts as a deoxidizer because of high affinity for oxygen. Also, Al is combined with N and O to form oxide, nitride, oxynitride, etc., which are dispersed in the melt to act as nuclei for crystallizing fine MC carbide uniformly. More than 0.5% by mass of Al makes the outer layer brittle, while less than 0.001% by mass of Al provides insufficient effects. The upper limit of the Al content is more preferably 0.3% by mass, and most preferably 0.2% by mass. To obtain sufficient effects, the lower limit of the Al content is more preferably 0.01% by mass. As an example, the Al content range is more preferably 0.01-0.3% by mass, and most preferably 0.01-0.2% by mass.

(e) S: 0.3% or Less by Mass 0.3% or less by mass of S may be contained when the lubrication of MnS is utilized as described above. More than 0.3% by mass of S makes the outer layer brittle. When the lubrication of MnS is utilized, the upper limit of the S content is more preferably 0.2% by mass, and most preferably 0.15% by mass. Also, the lower limit of the S content is more preferably 0.05% by mass. As an example, the S content range is more preferably 0.05-0.2% by mass, and most preferably 0.05-0.15% by mass. On the other hand, when the lubrication of MnS is not utilized, S is preferably 0.1% or less by mass, more preferably 0.05% or less by mass, and most preferably 0.03% or less by mass, to suppress the embrittlement of the outer layer.

(3) Inevitable Impurities

The balance in the composition of the outer layer are Fe and inevitable impurities. Among the inevitable impurities, the amount of P is preferably as small as possible because P deteriorates the mechanical properties. Specifically, the P content is preferably 0.1% or less by mass. As other inevitable impurities, elements such as Cu, Sb, Te, Ce, etc. may be contained in ranges not deteriorating the properties of the outer layer. To secure excellent wear resistance and incident resistance of the outer layer, the total amount of the inevitable impurities is preferably 0.7% or less by mass.

(4) Structure

The structure of the outer layer is composed of (a) MC carbide, (b) Mo-based, $M_2C$ or $M_6C$ carbide (Mo carbide) or Cr-based, $M_7C_3$ or $M_{23}C_6$ carbide (Cr carbide), (c) carboboride, and (d) a matrix. The carboboride generally has a composition of M(C, B), wherein a metal M is mainly at least one of Fe, Cr, Mo, V, Nb and W, the ratio of the metal M to C and B being variable depending on the composition. The structure of the outer layer preferably does not contain graphite. The outer layer of the rolling composite roll has excellent wear resistance because of hard MC carbide, Mo carbide or Cr carbide, and excellent sticking resistance because of carboboride.

(B) Inner Layer

The inner layer of the rolling composite roll is formed by ductile cast iron (spheroidal graphite cast iron) having excellent toughness. The preferred composition of the ductile cast iron comprises by mass 2.4-3.6% of C, 1.5-3.5% of Si, 0.1-2% of Mn, 0.1-2% of Ni, less than 0.7% of Cr, less than 0.7% of Mo, 0.01-1% of V, 0-0.5% of W, 0-0.2% of Nb, and 0.01-0.1% of Mg, the balance being Fe and inevitable impurities. The use of the ductile cast iron for the inner layer can prevent the breakage of the composite roll by a rolling load in a finishing stand.

Among the inevitable impurities, P, S and N deteriorate the mechanical properties. Accordingly, their amounts are preferably as small as possible. Specifically, the P content is preferably 0.1% or less by mass, the S content is preferably 0.05% or less by mass, and the N is preferably 0.07% or less by mass. Also, the amount of B is preferably less than 0.05% by mass because B hinders graphitization in the inner layer. When the outer layer contains elements such as Zr, Co, Ti, Al, etc., they are considered as inevitable impurities. Further, elements such as Ba, Cu, Sb, Te, Ce, rare earth metal elements, etc. are also considered as inevitable impurities. The total amount of these elements is preferably 0.7% or less by mass.

(C) Properties

In the centrifugally cast composite roll of the present invention for rolling, the circumferential residual compressive stress of the outer layer at the discard diameter is preferably 150-350 MPa, and more preferably 160-300 MPa. With such circumferential residual compressive stress, cracking is unlikely generated on the outer layer surface even when cobble occurs, and cracks if any would unlikely propagate. Incidentally, the discard diameter of the outer layer is a diameter at the maximum usable depth of the outer layer. For example, the maximum usable depth of the outer layer from the initial diameter is about 40-60 mm in a composite roll having an outer diameter of 600-850 mm, and about 30-60 mm in a composite roll having an outer diameter of 450 mm to less than 600 mm. In this range, the discard diameter of the outer layer can be determined depending on the specification of a rolling machine.

Because the inner surface of the outer layer is melted to some extent when it is fused to the inner layer, a boundary between the outer layer and the inner layer in a final product is positioned outside the inner surface of the outer layer. Because the boundary of the fused outer and inner layers is inevitably ragged, the discard diameter of the outer layer is designed with safety margin such that it is surely larger than the diameter of the boundary of the fused outer and inner layers, to avoid the boundary from existing in the region used for rolling. Specifically, the thickness of the outer layer at the discard diameter (distance from the outer surface of the roll at the discard diameter to the boundary with the fused inner layer) is preferably 8 mm or more. The smaller the thickness of the outer layer, the larger the circumferential residual compressive stress. Accordingly, the outer layer should have thickness larger than a predetermined level. With respect to the relation between the discard diameter of the outer layer and the inner diameter of the as-cast outer layer, the discard diameter of the outer layer is preferably the inner diameter of the as-cast outer layer+18-27.5 mm, as is clear from Examples described below.

In the centrifugally cast composite roll of the present invention for rolling, the outer layer surface at the initial diameter has Shore hardness of preferably 70-90, and more preferably 75-85, to secure the wear resistance of the outer layer. Incidentally, the initial diameter of the outer layer is a diameter of a usable outer layer obtained by grinding an as-centrifugally-cast outer layer, and grinding is repeated from that diameter (initial diameter) to the discard diameter. The initial diameter of the outer layer is usually a diameter after the as-centrifugally-cast outer surface is ground to the depth of 5-30 mm.

When the composite roll comprises an intermediate layer described below, the distance from the outer diameter of the roll at the discard diameter to a boundary of the fused intermediate and inner layers is preferably 8 mm or more.

(D) Intermediate Layer

Though the centrifugally cast composite roll for rolling according to the present invention has been explained, an intermediate layer having an intermediate composition to those of the outer and inner layers may be provided as a buffer layer between the outer layer and the inner layer. The intermediate layer is preferably as thick as 8-30 mm.

(E) Roll Size

Though the size of the centrifugally cast composite roll for rolling according to the present invention is not particularly restricted, the preferred example is that the outer diameter of the outer layer is 200-1300 mm, the length of a roll body is 500-6000 mm, and the thickness of an outer layer portion usable for rolling is 25-200 mm

[2] Production Method of Centrifugally Cast Composite Roll for Rolling

The method of the present invention for producing a centrifugally cast composite roll for rolling comprises (1) centrifugally casting the outer layer in a rotating centrifugally casting cylindrical mold, (2) casting a melt for the inner layer into a cavity of the outer layer, reheating the outer layer to an austenization temperature or higher during or after casting the inner layer, and cooling the resultant composite roll at a cooling rate of 10-60° C./hr between the reheating temperature and 600° C.

The reheating of the outer layer includes (a) reheating the outer layer after the centrifugally cast composite roll comprising the outer layer and the inner layer integrally fused to each other is produced, and (b) reheating the inner surface of the outer layer by the cast inner layer melt. The reheating temperature of the outer layer is a temperature of reheating the outer surface of the outer layer in the case (a), or a temperature of reheating the inner surface of the outer layer by casting a melt for the inner layer in the case (b).

The first indispensable condition of the method of the present invention is that the reheating temperature of the outer layer is an austenization temperature γ or higher. The Fe-based alloy forming the outer layer of the present invention has an austenization temperature γ of 800-840° C. Accordingly, the reheating temperature of the outer layer is 800° C. or higher. Because the reheating of the outer layer may remelt the boundary of the outer and inner layers to generate defects, the upper limit of the reheating temperature of the outer layer is equal to or lower than a temperature at which the boundary of the outer and inner layers is not remelted. Specifically, the reheating temperature of the outer layer is preferably 800-1200° C.

The second indispensable condition in the method of the present invention is that cooling is conducted at a cooling rate of 10-60° C./hr between the reheating temperature and 600° C. Between the reheating temperature and 600° C., the cooling rate of less than 10° C./hr provides the outer layer with too low hardness, while the cooling rate of more than 60° C./hr provides the outer layer with too large residual compressive stress. The lower limit of the cooling rate between the reheating temperature and 600° C. is preferably 15° C./hr, and the upper limit is preferably 55° C./hr. The preferred cooling rate between the reheating temperature and 600° C. is, for example, 15-55° C./hr.

Because a hardness-decreasing pearlite transformation may occur at 600° C. or higher, cooling is conducted to 600° C. while keeping austenite without causing the pearlite transformation. After cooled to 600° C., the cooling rate is not restrictive. For example, the centrifugally cast composite roll may be left to cool in the casting mold.

After cooling from 600° C. to a range of room temperature to 450° C., the centrifugally cast composite roll is preferably tempered at a temperature of 500-550° C. Tempering provides high toughness while keeping sufficient wear resistance.

Figure 2A:
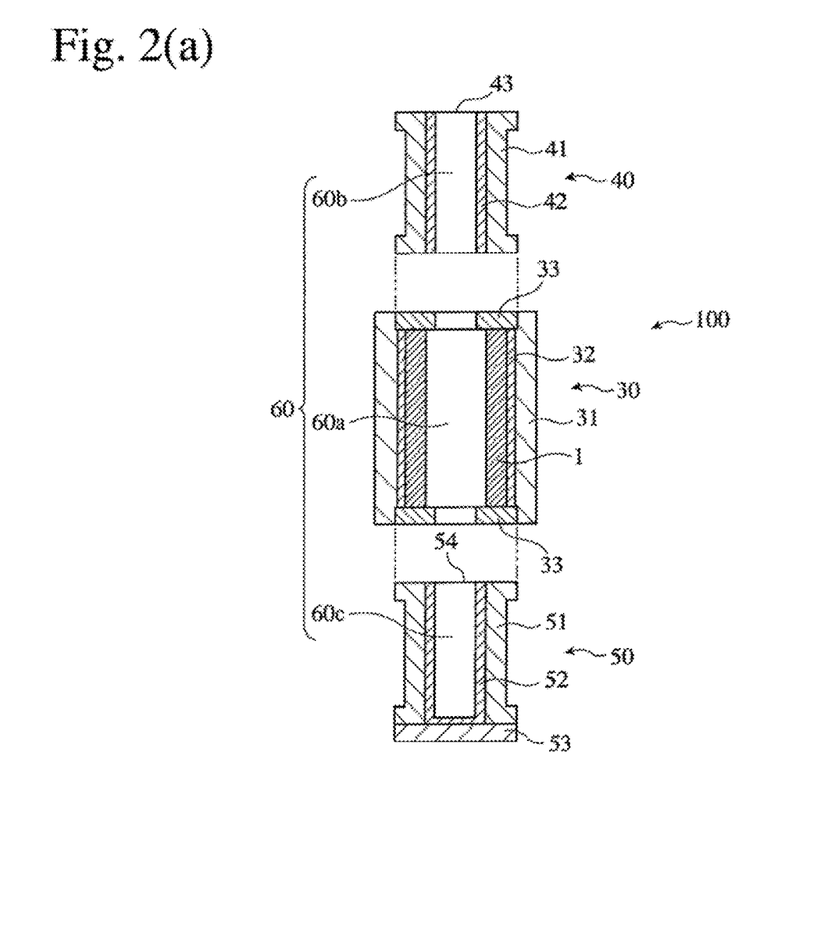
FIG. 2(a) is an exploded cross-sectional view showing an example of static casting molds used for producing a centrifugally cast composite roll for rolling.
Figure 2B:
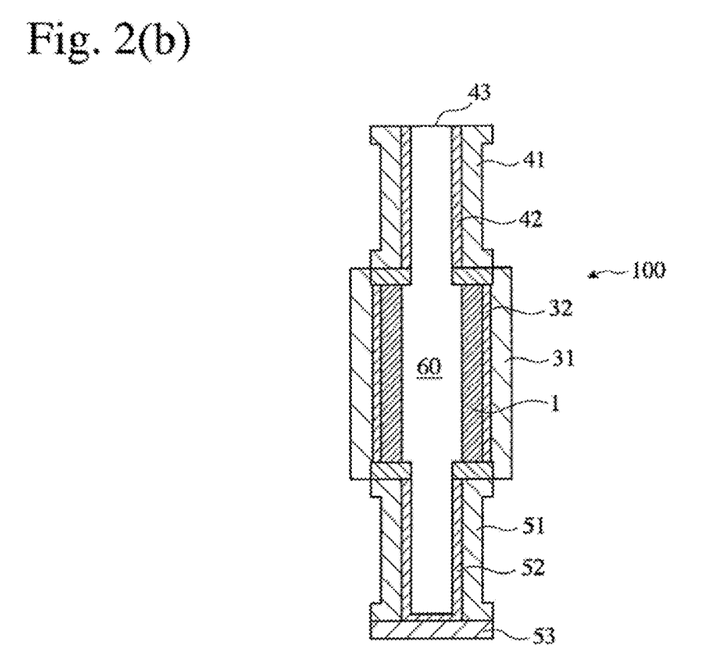
FIG. 2(b) is a cross-sectional view showing an example of static casting molds used for producing a centrifugally cast composite roll for rolling.

Specifically, the centrifugally cast composite roll is preferably produced by the following method. FIGS. 2(a) FIG. 2(b) show an example of static casting molds for casting the inner layer 2 into the outer layer 1 centrifugally cast in the centrifugally casting cylindrical mold 30. The static casting mold 100 comprises a cylindrical mold 30 containing the outer layer 1 on the inner surface, and an upper mold 40 and a lower mold 50 mounted to upper and lower ends of the cylindrical mold 30. The cylindrical mold 30 comprises a mold body 31, a sand mold 32 formed in the mold body 31, and sand molds 33, 33 formed in upper and lower end portions of the mold body 31 and the sand mold 32. The upper mold 40 comprises a mold body 41, and a sand mold 42 formed in the mold body 41. The lower mold 50 comprises a mold body 51, and a sand mold 52 formed in the mold body 51. The lower mold 50 is provided with a bottom plate 53 for holding a melt for the inner layer. The inner surface of the outer layer 1 in the cylindrical mold 30 constitutes a cavity 60a for forming the core portion 21 of the inner layer 2, the upper mold 40 has a cavity 60b for forming the shaft portion 23 of the inner layer 2, and the lower mold 50 has a cavity 60c for forming the shaft portion 22 of the inner layer 2. A centrifugal casting method may be conducted by using the cylindrical mold 30, which is horizontal, inclined or vertical.

The cylindrical mold 30 containing the centrifugally cast outer layer 1 is erected on an upper end 54 of the lower mold 50 for forming the shaft portion 22, and the upper mold 40 for forming the shaft portion 23 is mounted onto the cylindrical mold 30 to constitute the static casting mold 100. In the static casting mold 100, the cavity 60a of the outer layer 1 is communicating with the cavity 60b of the upper mold 40 and the cavity 60c of the lower mold 50, constituting a cavity 60 for integrally forming the entire inner layer 1.

After the centrifugally cast outer layer 1 is solidified, a ductile cast iron (spheroidal graphite cast iron) melt for the inner layer 2 is poured into the cavity 60 through the upper opening 43 of the upper mold 40. A surface of the melt in the cavity 60 is gradually elevated from the lower mold 50 to the upper mold 40, so that the inner layer 2 comprising the shaft portion 22, the core portion 21 and the shaft portion 23 is integrally cast.

An intermediate layer may be formed by centrifugal casting on the inner surface of the centrifugally cast outer layer, as a buffer layer with the inner layer.

The present invention will be explained in further detail by Examples, without intention of restricting the present invention thereto.

Examples 1-4, and Comparative Examples 1 and 2

With the cylindrical mold 30 shown in FIG. 2(a) set in a horizontal centrifugal casting machine, each melt having the chemical composition shown in Table 1 was centrifugally cast to form an outer layer 1. The number of times of gravity on an outer peripheral surface of the outer layer was 120 G. After the outer layer 1 was solidified, the cylindrical mold 30 having the outer layer 1 formed inside was erected, and mounted onto a lower hollow mold 50 for forming a shaft portion 22. An upper hollow mold 40 for forming a shaft portion 23 was mounted onto the cylindrical mold 30, to constitute a static casting mold 100 shown in FIG. 2(b).

A ductile cast iron melt having the chemical composition shown in Table 1 was poured as a melt for an inner layer into a cavity 60 of the outer layer 1 inside the static casting mold 100 through an upper opening 43, during which a graphitization inoculant containing Si was added. After the solidification of the inner layer was completed, the static casting mold 100 was disassembled to take out the resultant composite roll. This composite roll was put in a heat treatment furnace, and heated to the reheating temperature T° C. shown in Table 2 and kept at that temperature for 2 hours. Thereafter, the composite roll was cooled in the heat treatment furnace, which was controlled to have the cooling rate shown in Table 2 between the reheating temperature of the outer layer 1 and 600° C. The cooling rate was measured by a thermocouple in contact with the outer layer surface, to calculate an average cooling rate between the reheating temperature and 600° C. Each centrifugally cast composite roll cooled to lower than 600° C. was subjected to temping at 530° C. for 10 hours twice, to obtain the centrifugally cast composite roll comprising the inner layer 2 integrally fused to the inner surface of the outer layer 1. The sizes of the as-cast composite rolls are shown in Table 3.

TABLE 1

| No. | | Chemical Composition (% by mass) [1] | | | | | |
|---|---|---|---|---|---|---|---|
| | | C | Si | Mn | Ni | Cr | Mo |
| Example 1 | Outer Layer | 1.88 | 0.76 | 0.32 | 1.20 | 4.50 | 5.10 |
| | Inner Layer | 2.92 | 2.60 | 0.36 | 0.48 | 0.06 | 0.02 |

TABLE 1-continued

| No. | | C | Si | Mn | Cr | Mo | Ni |
|---|---|---|---|---|---|---|---|
| Example 2 | Outer Layer | 2.67 | 1.56 | 0.78 | 2.79 | 7.13 | 3.10 |
| | Inner Layer | 3.42 | 2.44 | 0.42 | 0.46 | 0.11 | 0.03 |
| Example 3 | Outer Layer | 2.15 | 0.87 | 0.43 | 2.21 | 5.22 | 4.64 |
| | Inner Layer | 2.94 | 2.45 | 0.31 | 0.48 | 0.10 | 0.03 |
| Example 4 | Outer Layer | 1.91 | 0.82 | 0.39 | 1.81 | 5.51 | 5.31 |
| | Inner Layer | 3.05 | 2.55 | 0.39 | 0.56 | 0.08 | 0.02 |
| Com. Ex. 1 | Outer Layer | 1.85 | 0.92 | 0.85 | 0.20 | 5.12 | 6.11 |
| | Inner Layer | 3.35 | 2.40 | 0.47 | 0.58 | 0.11 | 0.05 |
| Com. Ex. 2 | Outer Layer | 1.84 | 0.88 | 0.41 | 0.57 | 4.90 | 5.47 |
| | Inner Layer | 3.32 | 2.45 | 0.40 | 0.48 | 0.13 | 0.03 |

| | | Chemical Composition (% by mass) [1] | | | | | |
|---|---|---|---|---|---|---|---|
| No. | | W | V | Nb | B | N | Mg |
| Example 1 | Outer Layer | 0.24 | 5.10 | 0.92 | 0.06 | 0.04 | — |
| | Inner Layer | — | 0.02 | — | — | — | 0.043 |
| Example 2 | Outer Layer | 1.01 | 3.61 | 0.54 | 0.03 | 0.02 | — |
| | Inner Layer | — | 0.04 | — | — | — | 0.05 |
| Example 3 | Outer Layer | 1.78 | 4.28 | 1.17 | 0.12 | 0.05 | — |
| | Inner Layer | — | 0.03 | — | — | — | 0.049 |
| Example 4 | Outer Layer | 0.83 | 5.44 | 0.74 | 0.09 | 0.05 | — |
| | Inner Layer | — | 0.03 | — | — | — | 0.045 |
| Com. Ex. 1 | Outer Layer | 0.18 | 5.24 | 1.47 | 0.01 | 0.03 | — |
| | Inner Layer | — | 0.05 | — | — | — | 0.055 |
| Com. Ex. 2 | Outer Layer | 0.10 | 5.59 | 0.09 | 0.004 | 0.04 | — |
| | Inner Layer | — | 0.04 | — | — | — | 0.048 |

Note:
[1] The balance are Fe and inevitable impurities in each chemical composition.

TABLE 2

| | Cooling | | Tempering | | |
|---|---|---|---|---|---|
| No. | T [1] (° C.) | Rate [2] (° C./hr) | Temperature (° C.) | Time (hr) | N [3] |
| Example 1 | 990 | 37 | 530 | 10 | 2 |
| Example 2 | 990 | 38 | 530 | 10 | 2 |
| Example 3 | 990 | 24 | 530 | 10 | 2 |
| Example 4 | 990 | 31 | 530 | 10 | 2 |
| Com. Ex. 1 | 1040 | 345 | 530 | 10 | 2 |
| Com. Ex. 2 | 1100 | 412 | 530 | 10 | 2 |

Note:
[1] The reheating temperature of the outer layer.
[2] The cooling rate in a temperature range of T to 600° C.
[3] The number of repeated tempering.

TABLE 3

| | Size of As-Cast Composite Roll (mm) | | | |
|---|---|---|---|---|
| | Outer Layer | | | Length of |
| No. | Outer Diameter | Thickness [1] | Length | Overall Roll |
| Example 1 | 697 | 88.5 | 2700 | 6300 |
| Example 2 | 690 | 92.5 | 2700 | 6240 |
| Example 3 | 799 | 97.5 | 3100 | 5385 |
| Example 4 | 697 | 88.5 | 2700 | 6300 |
| Com. Ex. 1 | 795 | 92.5 | 2700 | 5327 |
| Com. Ex. 2 | 850 | 94.5 | 2500 | 5785 |

Note:
[1] The average thickness of the outer layer.

The outer layer surface of each centrifugally cast composite roll was machined to obtain a centrifugally cast composite roll for rolling. The initial diameter and discard diameter of each composite roll are shown in Table 4. In each composite roll, the Shore hardness and sticking resistance of the outer layer, and the circumferential residual compressive stress of the outer layer at the discard diameter were measured by the following methods. The results are shown in Table 4.

(1) Shore Hardness (Hs) of Outer Layer

The Shore hardness of the outer layer surface of each composite roll was measured at the initial diameter according to JIS Z 2246.

(2) Circumferential Residual Compressive Stress (MPa) of Outer Layer at Discard Diameter A center portion of the outer layer of each composite roll along the roll axis was removed to the depth of the discard diameter, to measure the circumferential residual compressive stress of the outer layer surface at the discard diameter by an X-ray diffraction residual stress meter.

(3) Sticking Resistance

Figure 3:
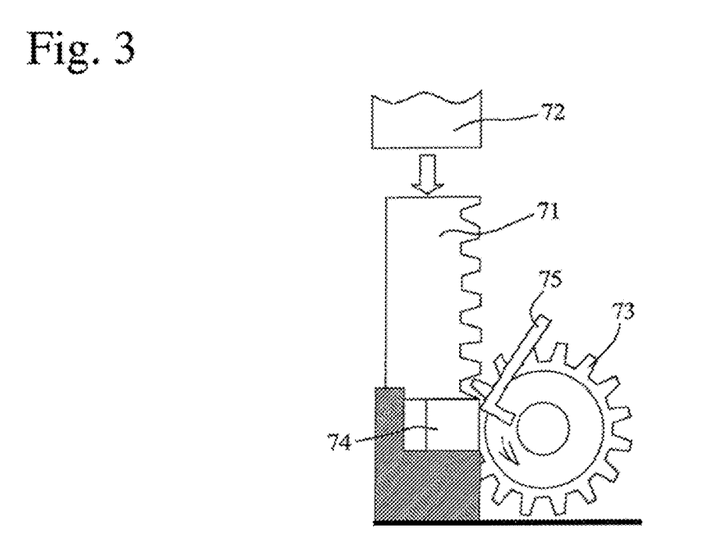
FIG. 3 is a schematic view showing a test machine of thermal shock by friction.

To evaluate sticking resistance, a sticking test was conducted on each test piece (25 mm×30 mm×25 mm) cut out of an axial end portion of the outer layer by a test machine of thermal shock by friction shown in FIG. 3. The test machine of thermal shock by friction comprises a rack 71 onto which a weight 72 is dropped to rotate a pinion 73, so that a biting member 75 (material: mild steel) is brought into strong contact with a test piece 74. The degree of sticking was evaluated by the area ratio of sticking as described below. The smaller the area ratio of sticking, the better the sticking resistance (incident resistance).

Good: Less sticking (the area ratio of sticking was less than 40%).

Fair: More sticking (the area ratio of sticking was 40% or more and less than 60%).

Poor: Extreme sticking (the area ratio of sticking was 60% or more).

TABLE 4

| | Composite Roll | | | | |
|---|---|---|---|---|---|
| No. | Initial Diameter (mm) | Discard Diameter (mm) | Shore Hardness [1] | Residual Compressive Stress [2] (MPa) | Sticking |
| Example 1 | 655 | 575 | 76 | 254 | Good |
| Example 2 | 640 | 560 | 78 | 199 | Good |

TABLE 4-continued

| | Composite Roll | | | | |
|---|---|---|---|---|---|
| No. | Initial Diameter (mm) | Discard Diameter (mm) | Shore Hardness [1] | Residual Compressive Stress [2] (MPa) | Sticking |
| Example 3 | 740 | 640 | 83 | 298 | Good |
| Example 4 | 655 | 575 | 81 | 237 | Good |
| Com. Ex. 1 | 740 | 640 | 81 | 392 | Fair |
| Com. Ex. 2 | 810 | 710 | 83 | 418 | Poor |

Note:
[1] The Shore hardness of the outer layer at the initial diameter.
[2] The circumferential residual compressive stress of the outer layer at the discard diameter.

As is clear from Table 4, any composite roll of Examples 1-4 exhibited Shore hardness of 76 or more, excellent wear resistance, at the initial diameter, and circumferential residual compressive stress in a range of 150-350 MPa, particularly in a range of 160-300 MPa, at the discard diameter. On the other hand, the composite rolls of Comparative Examples 1 and 2 had as large circumferential residual compressive stress as 392 MPa and 418 MPa at the discard diameter, despite high Shore hardness at the initial diameter. Also, the test pieces of the outer layers of Examples 1-4 underwent little sticking, while the test piece of Comparative Example 1 suffered relatively large sticking, and the test piece of Comparative Example 2 suffered extreme sticking. It is thus expected that the use of the composite rolls of Examples 1-4 can suppress the risk that cracks generated on the roll surface induce delayed failure, even though cobble occurs in the finish hot-rolling.

DESCRIPTION OF REFERENCE NUMERALS

1: Outer layer
2: Inner layer
10: Centrifugally cast composite roll for rolling
21: Core portion
22, 23: Shaft portion
30: Cylindrical mold for centrifugal casting
31, 41, 51: Mold body
32, 33, 42, 52: Sand mold
40: Static upper casting mold
50: Static lower casting mold
60, 60*a*, 60*b*, 60*c*: Cavity
100: Static casting mold

What is claimed is:

1. A centrifugally cast composite roll for rolling comprising an outer layer and inner layer, which are integrally fused to each other;
    said outer layer being made of an Fe-based alloy comprising by mass 1.70-2.70% of C, 0.3-3% of Si, 0.1-3% of Mn, 1.1-3.0% of Ni, 4.0-10% of Cr, 2.0-7.5% of Mo, 3-6.0% of V, 0.1-2% of W, 0.2-2% of Nb, 0.01-0.2% of B, and 0.01-0.1% of N, the balance being Fe and inevitable impurities; and
    said inner layer being made of ductile cast iron,
    wherein said outer layer has circumferential residual compressive stress of 150-350 MPa at a discard diameter and Shore hardness of 70-90 at an initial diameter.

2. The centrifugally cast composite roll for rolling according to claim 1, wherein said outer layer has a structure containing no graphite.

3. A method for producing a centrifugally cast composite roll for rolling of claim 1, comprising the steps of
    centrifugally casting said outer layer in a rotating centrifugally casting cylindrical mold;
    casting a melt for said inner layer into a cavity of said outer layer;
    reheating said outer layer at an austenization temperature or higher after or during casting said inner layer; and
    cooling the resultant composite roll at a cooling rate of 10-60° C./hr between the reheating temperature and 600° C.

4. The method for producing a centrifugally cast composite roll for rolling according to claim 3, wherein said centrifugally cast composite roll is tempered at a temperature of 500-550° C. after cooled from 600° C. to a temperature in a range of room temperature to 450° C.

* * * * *